(12) United States Patent
Arakawa (10) Patent No.: US 11,085,504 B2
(45) Date of Patent: Aug. 10, 2021

(54) VIBRATION ISOLATOR

(71) Applicant: Toyo Tire Corporation, Itami (JP)

(72) Inventor: Sayaka Arakawa, Itami (JP)

(73) Assignee: TOYO TIRE CORPORATION, Itami (JP)

( * ) Notice: Subject to any disclaimer, the term of this patent is extended or adjusted under 35 U.S.C. 154(b) by 0 days.

(21) Appl. No.: 16/877,669

(22) Filed: May 19, 2020

(65) Prior Publication Data

US 2020/0378465 A1  Dec. 3, 2020

(30) Foreign Application Priority Data

May 28, 2019  (JP) .............................. JP2019-099080

(51) Int. Cl.
  *F16F 13/10*  (2006.01)
(52) U.S. Cl.
  CPC .......... *F16F 13/101* (2013.01); *F16F 13/103* (2013.01); *F16F 2222/12* (2013.01); *F16F 2224/025* (2013.01); *F16F 2230/0005* (2013.01); *F16F 2232/08* (2013.01)
(58) Field of Classification Search
  CPC .... F16F 13/101; F16F 13/103; F16F 2222/12; F16F 2224/025; F16F 2230/0005; F16F 2232/08
  See application file for complete search history.

(56) References Cited

U.S. PATENT DOCUMENTS

| | | | |
|---|---|---|---|
| 9,068,625 B2 | 6/2015 | Yamamoto et al. | |
| 2007/0018366 A1* | 1/2007 | Maeno et al. | |
| 2008/0029942 A1* | 2/2008 | Kern | F16F 13/1409 |
| | | | 267/140.13 |
| 2013/0161883 A1* | 6/2013 | Nishi | F16F 13/101 |
| | | | 267/140.13 |
| 2019/0072152 A1* | 3/2019 | Kim | F16F 13/107 |

FOREIGN PATENT DOCUMENTS

| | | | | |
|---|---|---|---|---|
| EP | 2306044 A2 * | 4/2011 | ............ | F16F 13/101 |
| JP | 5568472 B2 | 8/2014 | | |
| KR | 20060052613 A * | 5/2006 | ............ | F16F 13/101 |
| WO | WO-2010139315 A1 * | 12/2010 | ............ | F16F 13/101 |

* cited by examiner

*Primary Examiner* — Melanie Torres Williams
(74) *Attorney, Agent, or Firm* — Westerman, Hattori, Daniels & Adrian, LLP (57) ABSTRACT

A vibration isolator comprises: a first member in which an end portion of a shaft portion being fixed to a mating member; a vibration-isolation base made of an elastic body connecting a second member and the first member; and a stopper made of an elastic body arranged between the second member and the mating member with the first surface. The shaft portion is arranged in the hole of the stopper with the end portion facing the matching member. The inner surface of the hole of the stopper, prior to the shaft portion is inserted into the hole, includes: a first portion having a span smaller than the thickness of the end portion of the shaft portion; and a second portion arranged between the first portion and the second surface. A span of the second portion is greater than the span of the first portion.

7 Claims, 9 Drawing Sheets

VIBRATION ISOLATOR

TECHNICAL FIELD

The present invention relates to a vibration isolator comprising a stopper.

BACKGROUND ART

Patent Literature 1 discloses a vibration isolator comprising: a first member being fixed to a mating member, such as a power unit; a second member spaced from the first member; a vibration-isolation base made of an elastic body connecting the second member and the first member; and a stopper made of the elastic body through which the shaft portion penetrates, wherein the stopper is arranged between the second member and the mating member. In this type of the vibration isolator, the stopper is interposed between the mating member and the second member to mitigate collisions between the mating member and the second member. The stopper is fixed to the shaft portion using friction between the stopper and the shaft portion so that the stopper does not detach from the shaft portion prior to the first member being fixed to the mating member.

CITATION LIST

Patent Literature

[Patent Literature 1] Japanese Patent No. 5568472

SUMMARY OF INVENTION

Technical Problem

Unfortunately, if friction between the hole of the stopper and the shaft portion is increased, the stopper can be less likely to detach from the shaft portion. This makes it difficult to insert the shaft portion into the hole of the stopper in manufacturing process of the vibration isolator. While, if friction between the hole of the stopper is reduced, the shaft portion can be easily inserted into the hole of the stopper in the manufacturing process of the vibration isolator. This causes the stopper to be likely to detach from the shaft portion prior to the vibration isolator being fixed to the mating member.

It is an object of the present invention to provide a vibration isolator configured such that a shaft portion can be easily inserted into a hole of a stopper and a stopper can be less likely to detach from the shaft portion.

Solution to Problem

A vibration isolator of the present invention to achieve this object includes a first member, a second member, a vibration-isolation base, and a stopper made of an elastic body. The first member comprises a shaft portion extending along the axis line, an end portion of the shaft portion being fixed to a mating member. The second member is spaced from the first member and at least a portion of the second member is spaced from the shaft portion perpendicular to the axis line. The vibration-isolation base is made of an elastic body connecting the second member and the first member. The stopper includes a first surface and a second surface on the other side of a first surface. The stopper is arranged between the second member and the mating member: the first surface of the stopper is directed to the mating member; the second surface of the stopper is directed to the second member. A hole of the stopper connects the first surface and the second surface. The shaft portion is arranged in the hole of the stopper with the end portion facing the matching member. The inner surface of the hole of the stopper includes: a first portion; and a second portion arranged between the first portion and the second surface. Prior to the shaft portion being arranged in the hole of the stopper, the span of the first portion is smaller than the end portion thickness of the shaft portion, and the span of the second portion is greater than the span of the first portion.

Advantageous Effects of Invention

With the vibration isolator according to a first aspect, when the shaft portion is inserted from the second surface of the stopper into the hole of the stopper, the end portion of the shaft portion reaches the second portion and then reaches the first portion. The span of the first portion is smaller than the end portion thickness of the shaft portion. Therefore, in a state where the shaft portion is inserted into the hole of the stopper, the stopper can be less likely to detach from the shaft portion due to friction between the shaft portion and the first portion. The span of the second portion is larger than the span of the first portion. Therefore, when the shaft portion is inserted into the hole of the stopper, the shaft portion spreads the first portion connecting the second portion. This ensures the shaft portion can be easily inserted into the hole of the stopper. Accordingly, the shaft portion can be easily inserted into the hole of the shaft portion and the stopper can be less likely to detach from the shaft portion.

With the vibration isolator according to a second aspect, the first portion is in contact with the shaft portion in a state the shaft portion is arranged in the hole of the stopper. This ensures the stopper can be much less likely to detach from the shaft portion due to friction between the inner surface of the hole and the shaft portion, in addition to the effects of the first aspect.

With the vibration isolator according to a third aspect, the first portion includes the entire periphery of the inner surface of the hole. Accordingly, the stopper can be much less likely to detach from the shaft portion, in addition to the effects of the second aspect.

With the vibration isolator according to a fourth aspect, the stopper has a convex portion raised from at least a portion of the first surface around the hole in the direction of the axis line. The first portion includes inside the elastically deformable convex portion. Accordingly, the shaft portion can be more easily inserted into the hole of the shaft portion, in addition to the effects of the first aspect.

With the vibration isolator according to a fifth aspect, the stopper includes a step between the first portion and the second surface, and the second portion is disposed between the step and the second surface. In a state where the shaft portion arranged in the hole of the stopper, the second portion is spaced from the shaft portion so that when a force toward the end portion of the shaft portion is applied to the stopper, the stopper bends at the step and the stopper is less likely to move toward the end portion of the shaft portion. Accordingly, the stopper can be much less likely to detach from the shaft portion, in addition to the effects of the fourth aspect.

With the vibration isolator according to a sixth aspect, in a state prior to the shaft portion being arranged in the hole, the span of the second portion is larger than the end portion thickness of the shaft portion. Accordingly, the shaft portion can be more easily inserted into the hole of the shaft portion, in addition to the effects of the first aspect.

With the vibration isolator according to a seventh aspect, the span of the inner surface increases from the first portion to the second portion in a state prior to the shaft portion being arranged in the hole. Accordingly, the shaft portion can be more easily inserted into the hole of the shaft portion, in addition to the effects of the first aspect.

DESCRIPTION OF EMBODIMENTS

Figure 1:
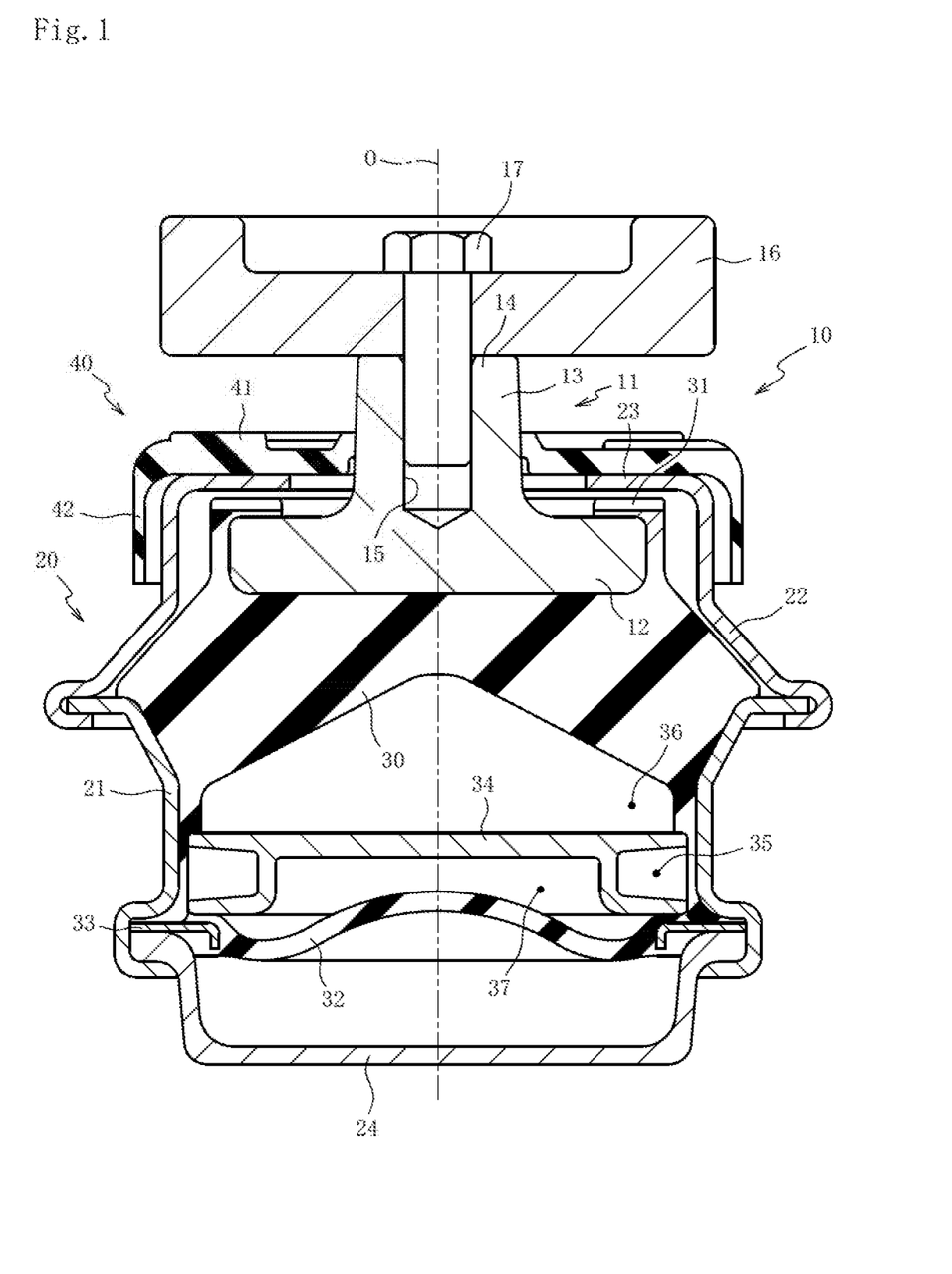
FIG. 1 is a cross-sectional view of a vibration isolator in a first embodiment.

The following describes preferable embodiments of the present invention with reference to the attached drawings. FIG. 1 is a cross-sectional view of a vibration isolator 10 according to a first embodiment. The vibration isolator 10 is a liquid-sealed vibration isolator which elastically supports a power unit such as an engine of a motor vehicle. FIG. 1 illustrates the vibration isolator 10 with no differential pressures between a main fluid chamber 36 and a sub-liquid chamber 37 (described later).

As illustrated in FIG. 1, the vibration isolator 10 comprises: a first member 11 and a second member 20 spaced from each other in the direction of the axis line O; a vibration-isolation base 30 connecting between the first member 11 and the second member 20; and a stopper 40 fixed to the first member 11. In the present embodiment, the first member 11 is fixed to a mating member 16 (brackets in the present embodiment) attached to a power unit (not illustrated) which is a vibration source, and the second member 20 is attached to a vehicle body frame (not illustrated). In the present embodiment, the axis line O of the vibration isolator 10 coincides with the vertical line.

The first member 11 is an integrally formed metallic member such as an iron-based material or an aluminum alloy. The first member 11 includes: a disk-shaped base 12 connected the vibration-isolation base 30; and a shaft portion 13 connected to the center of the base 12. The shaft portion 13 is a cylindrical part extending along the axis line O. A screw hole 15 is formed in the center of the shaft portion 13 along the axis line O. The screw hole 15 opens into an end portion 14 located on the other side of the base 12. In the present embodiment, the outer peripheral surface of the shaft portion 13 is formed in a tapered shape whose diameters gradually decrease toward the end portion 14. The shaft portion 13 is attached to the mating member 16, in a state where the end portion 14 is abutted against the mating member 16, using a bolt 17 attached to the screw hole 15.

A second member 20 is a cylindrical metallic member extending along the axis line O. The second member 20 includes a cylindrical body 21, an annular body 22, and a bottom member 24. The cylindrical body 21 is a cylindrical member having an inner diameter larger than the diameter of the base portion 12. The vibration-isolation base 30 is bonded to the inner peripheral surface of the cylindrical member 21. The annular body 22 is an annular member fixed to the cylindrical body 21. The annular body 22 has a displacement-regulating portion 23. The displacement-regulating portion 23 is a portion arranged around the shaft portion 13. A gap is formed between the displacement-regulating portion 23 and the shaft portion 13. The displacement-regulating portion 23 has a portion opposed to the base portion 12 in the direction of the axis line. The bottom member 24 is a bottomed cylindrical member fixed to the cylindrical body 21, and is arranged on the opposite side of the annular body 22.

A vibration-isolation base 30 is made of a substantially frusto-conical elastic body, such as rubber or thermoplastic elastomer, and connects the base 12 and the cylindrical body 21. In the present embodiment, the vibration-isolation base 30 is made of rubber and is vulcanized and bonded to the base 12 and the cylindrical body 21. In the vibration-isolation base 30, a membrane portion 31 is integrally molded. The membrane portion 31 is provided on the surface of the base portion 12 on the side of the displacement-regulating portion 23. The membrane portion 31 is interposed between the displacement-regulating portion 23 and the base portion 12.

A diaphragm 32 is a substantially circular flexible membrane made of an elastic body, such as rubber or thermoplastic elastomer. An annular fixing member 33 is bonded to the outer peripheral edge of the diaphragm 32. The fixture 33 is sandwiched between the cylindrical body 21 and the bottom member 24 over the entire circumference. Liquid such as water and ethylene glycol are sealed between the diaphragm 32 and the vibration-isolation base 30. A partition 34 is arranged between the diaphragm 32 and vibration-isolation base 30. The partition 34 forms an orifice 35 and partitions between the diaphragm 32 and the vibration-isolation base 30. Accordingly, a main liquid chamber 36 and a sub-liquid chamber 37 are formed. The orifice 35 communicates the main liquid chamber 36 and the sub-liquid chamber 37.

The vibration isolator 10 is tuned such that the orifices resonates when large-amplitude vibrations, such as engine shakes, are entered. Therefore, when a large-amplitude vibration is inputted into the vibration isolator 10 and a pressure difference is generated between the main liquid chamber 36 and the sub-liquid chamber 37, the liquid flows between the main liquid chamber 36 and the sub-liquid chamber 37 through the orifices 35, and the vibration is damped.

A stopper 40 is made of an elastic body such as rubber or thermoplastic elastomer. The stopper 40 is integrally formed with a substantially circular main body 41 arranged between the mating member 16 and the displacement-regulating portion 23, and a cylindrical side wall 42 extending along the axis line O from the outer peripheral edge of the main body 41. The side wall 42 is arranged outside the annular body 22. The stopper 40 is attached to the shaft portion 13, and the shaft portion 13 penetrates the body 41 of stopper 40.

Figure 2:
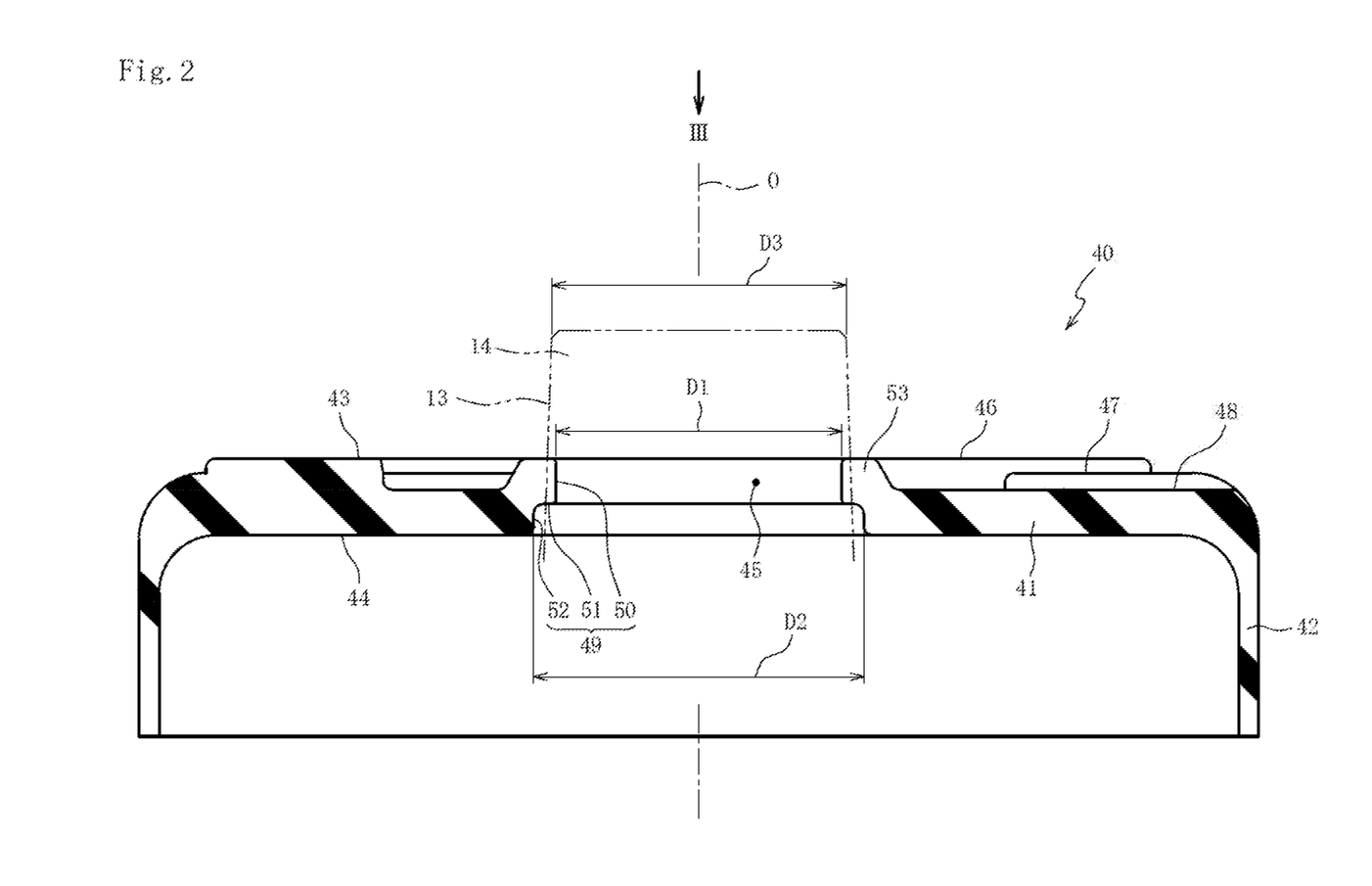
FIG. 2 is a cross-sectional view including the axis line of a stopper.
Figure 3:
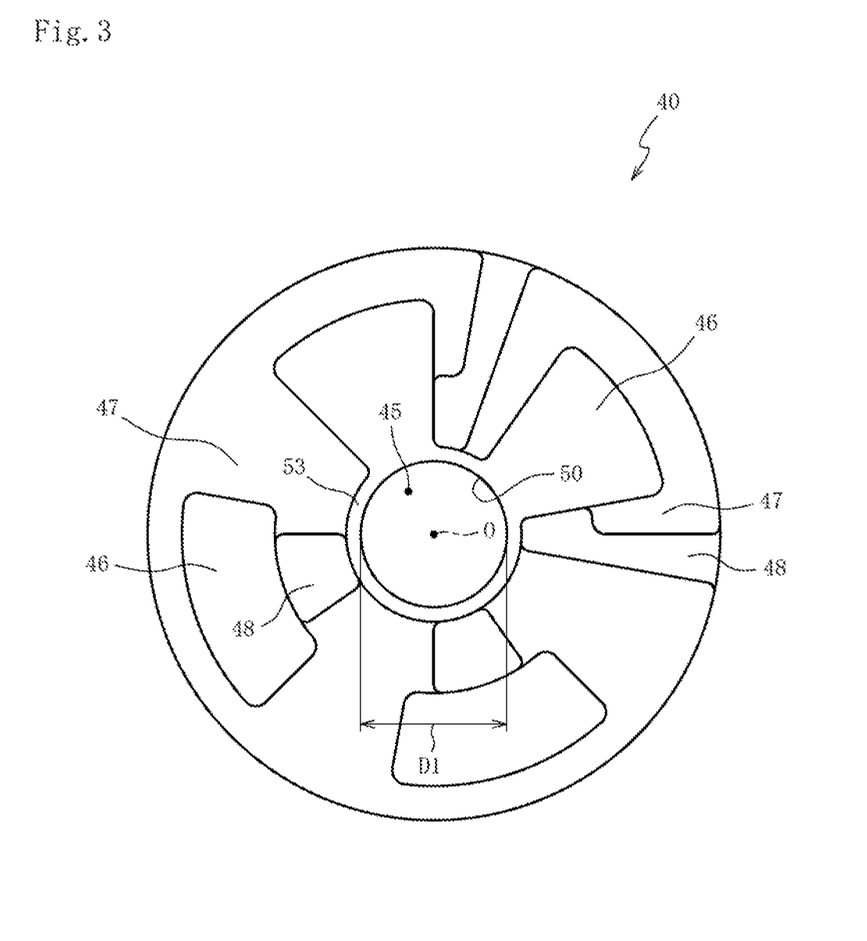
FIG. 3 is a plan view of the stopper as viewed in the direction of Arrow III in FIG. 2.

FIG. 2 is a cross-sectional view of the stopper 40 including the axis line O. FIG. 3 is a plan view of the stopper 40 as viewed in the direction of Arrow III in FIG. 2. FIGS. 2 and 3 illustrate the stopper 40 prior to be attached to the shaft portion 13. In FIG. 2, the shaft portion 13 when inserted into a hole 45 of the stopper 40 is illustrated in a long dashed double-short dashed line (the same applies to FIGS. 5, 6, 7 and 9). Therefore, in a state where the shaft portion 13 is actually inserted into the hole 45 of the stopper 40, the area inside the long dashed double-short dashed line indicating the shaft portion 13 and the area where the stopper 40 overlap indicate that the stopper 40 is crushed.

As illustrated in FIG. 2, the stopper 40 has a first surface 43 and a second surface 44 on the other side of the first surface 43 formed in the main body 41. The first surface 43 is formed with concavities and convexities, but the second surface 44 is flat. The hole 45 connecting the first surface 43 and the second surface 44 is formed in the center of the main body 41. The hole 45 penetrates the body 41. An inner surface 49 of the hole 45 is circular about the axis line O as in viewed in the direction of the axis line (see FIG. 3).

The first surface 43 of the main body 41 has a first stopper surface 46, a second stopper surface 47, and a third stopper surface 48. The first stopper surface 46 is the longest distance from the second surface 44 and the third stopper surface 48 is the shortest distance from the second surface 44. The distance between the second stopper surface 47 and the second surface 44 is intermediate the distance between the first stopper surface 46 and the second surface 44 and the distance between the third stopper surface 48 and the second surface 44. The first stopper surface 46, the second stopper surface 47, and the third stopper surface 48 define the load deflection curves when the stopper 40 regulates the deflection of the mating member 16 in the bound direction.

The inner surface 49 of the hole 45 includes a first portion 50 connected to the first surface 43, a second portion 52 connected to the second surface 44, and a step 51 formed between the first portion 50 and the second portion 52. The first portion 50 is a section in which a span D1 (the chord passing through the axis line O in this embodiment) is smaller than a diameter D3 of the end portion 14 of the shaft portion 13. The second portion 52 is a portion where a span D2 is larger than the span D1 of the first portion 50. The first portion 50 and the second portion 52 are cylindrical surfaces, and the step 51 is an annular surface. The step 51 is formed at a position closer to the second surface 44 than the third stopper surface 48. In the present embodiment, the span D2 of the second portion 52 is larger than the diameter D3 of the end portion 14 of the shaft portion 13.

The body 41 of the stopper 40 has a convex portion 53 raised from the first surface 43 (the third stopper surface 48) around the hole 45 in the direction of the axis line. The height of the convex portion 53 from the second surface 44 is higher than the height of the second stopper surface 47 from the second surface 44 and is the same height as the first stopper surface 46 from the second surface 44. The convex portion 53 is connected to the first stopper surface 46 (see FIG. 3). The span (diameter) of the peripheral edge of the convex portion 53 is larger than the span (diameter) of the peripheral edge of step 51. The first portion 50 is formed inside the convex portion 53. The first portion 50 and the second portion 52 are formed over the entire circumference of the inner surface 49 of the hole 45.

Referring back to FIG. 1, the followings will be described. In vibration isolator 10, the main body 41 of the stopper 40 is interposed between the mating member 16 and the displacement-regulating portion 23. The convex portion 53 (see FIG. 2) is arranged inside the displacement-regulating portion 23. The stopper 40 mitigates collisions between the mating member 16 and the second member 20 (the displacement-regulating portion 23) when a power unit (not illustrated) attached to the mating member 16 is bounced. The stopper 40 is fixed to the shaft portion 13 being fixed to the mating member 16, due to friction. The stopper 40 is arranged between the mating member 16 and the second member 20. Accordingly, abnormal noise generated when the stopper 40 collides with the second member 20 or the mating member 16 due to vibrations when the vehicle is traveling can be suppressed.

The shaft portion 13 is inserted into the hole 45 of stopper 40 from the second surface 44 of the stopper 40 when the vibration isolator 10 is manufactured. The stopper 40 is fixed to the shaft portion 13 using friction between the inner surface 49 (see FIG. 2) of the hole 45 of the stopper 40 and the shaft portion 13. Therefore, prior to the first member 11 being fixed to mating member 16 (Prior to the vibration isolator 10 is mounted on the vehicle), the stopper 40 does not detach from the shaft portion 13.

The stopper 40 may be bonded to the shaft portion 13 using a liquid or gel-like adhesive (e.g., a cyanoacrylate-based adhesive) so that the stopper 40 does not detach from the shaft portion 13 prior to the first member 11 being fixed to the mating member 16. However, when the shaft portion 13 is inserted into the hole 45 of the stopper 40 after an adhesive is applied to the shaft portion 13, the adhesive may flow along the surfaces of the shaft portion 13, so that a higher adhesive force may not be obtained. It is also difficult to inject an adhesive between the shaft portion 13 and the stopper 40 after inserting the shaft portion 13 into the hole 45 of the stopper 40. Thus, it is difficult to bond the stopper 40 to the shaft portion 13.

In contrast, according to the stopper 40, when the shaft portion 13 is inserted from the second surface 44 side of the stopper 40 into the hole 45 of the stopper 40 when the vibration isolator 10 is manufactured, the end portion 14 of the shaft portion 13 reaches the second portion 52, and then reaches the first portion 50. Since the span D1 of the first portion 50 is smaller than the thickness (the diameter in this embodiment) of the end portion 14 of the shaft portion 13, it is possible to prevent the stopper 40 from being detached from the shaft portion 13 using friction between the shaft portion 13 (the end portion 14) and the first portion 50 in a state where the shaft portion 13 is inserted into the hole 45 of the stopper 40 without using an adhesive.

The span D2 of the second portion 52 is larger than the span D1 of the first portion 50. Therefore, when the shaft portion 13 is inserted into the hole 45 of the stopper 40, the shaft portion 13 (the end portion 14) spreads the first portion 50 connecting the second portion 52. Accordingly, the shaft portion 13 can be easily inserted into the hole 45 of the stopper 40, and the stopper 40 can be less likely to detach from the shaft portion 13 (the end portion 14) after the shaft portion 13 is inserted into the hole 45. The operation of bonding the stopper 40 to the shaft portion 13 using an adhesive can also be omitted.

In a state where the shaft portion 13 is inserted into the hole 45 of the stopper 40, the first portion 50 is in contact with the shaft portion 13. This ensures the stopper 40 can be less likely to detach from the shaft portion 13 due to friction between the inner surface 49 of the hole 45 and the shaft portion 13. The first portion 50 is formed over the entire circumference of the inner surface 49 of the hole 45. Accordingly, the stopper 40 can be much less likely to detach from the shaft portion 13.

The stopper 40 has the convex portion 53 raised from at least a portion of the first surface 43 around the hole 45 in the direction of the axis line. The raised convex portion 53 tends to elastically deform radially outward. Since the first portion 50 is formed inside the deformable the convex portion 53, the shaft portion 13 can be more easily inserted into the hole 45 of the stopper 40. Since the convex portion 53 is arranged inside the displacement-regulating portion 23, the convex portion 53 does not affect the load deflection curves of the stopper 40.

The step 51 is formed between the first portion 50 and the second surface 44 of the stopper 40, and the second portion 52 is formed between the step 51 and the second surface 44. The second portion 52 is spaced from the shaft portion 13 in a state where the shaft portion 13 is inserted into the hole 45 of the stopper 40, when a force toward the end portion 14 side of the shaft portion 13 is applied to the stopper 40, the stopper 40 (the main body 41) bends at the step 51 and the first portion 50 can be less likely to move toward the end portion 14 side of the shaft portion 13. Therefore, it is possible to make the stopper 40 can be much less likely to detach from the shaft portion 13.

Since the step 51 is formed on the second surface 44 side of the third stopper surface 48 of the main body 41 on which the convex portion 53 is raised, the volume of convex portion 53 can be made larger than when the step 51 is formed on the first surface 43 side of the third stopper surface 48. Therefore, the rigidity of the convex portion 53 can be increased. As a result, the friction between the first portion 50 formed on the inner side of the convex portion 53 and the shaft portion 13 can be secured, thereby the stopper 40 can be less likely to detach from the shaft portion 13.

With the stopper 40, prior to the shaft portion 13 is inserted into the hole 45, the span D2 of the second portion 52 is larger than the thickness of the end portion 14 of the shaft portion 13. Therefore, the shaft portion 13 can be more easily inserted into the hole 45 of the stopper 40. In addition, the outer peripheral surface of the shaft portion 13 is formed in a tapered shape whose diameters gradually decrease toward the end portion 14. Therefore, the shaft portion 13 can be more easily inserted into the hole 45 of the stopper 40.

Figure 4:
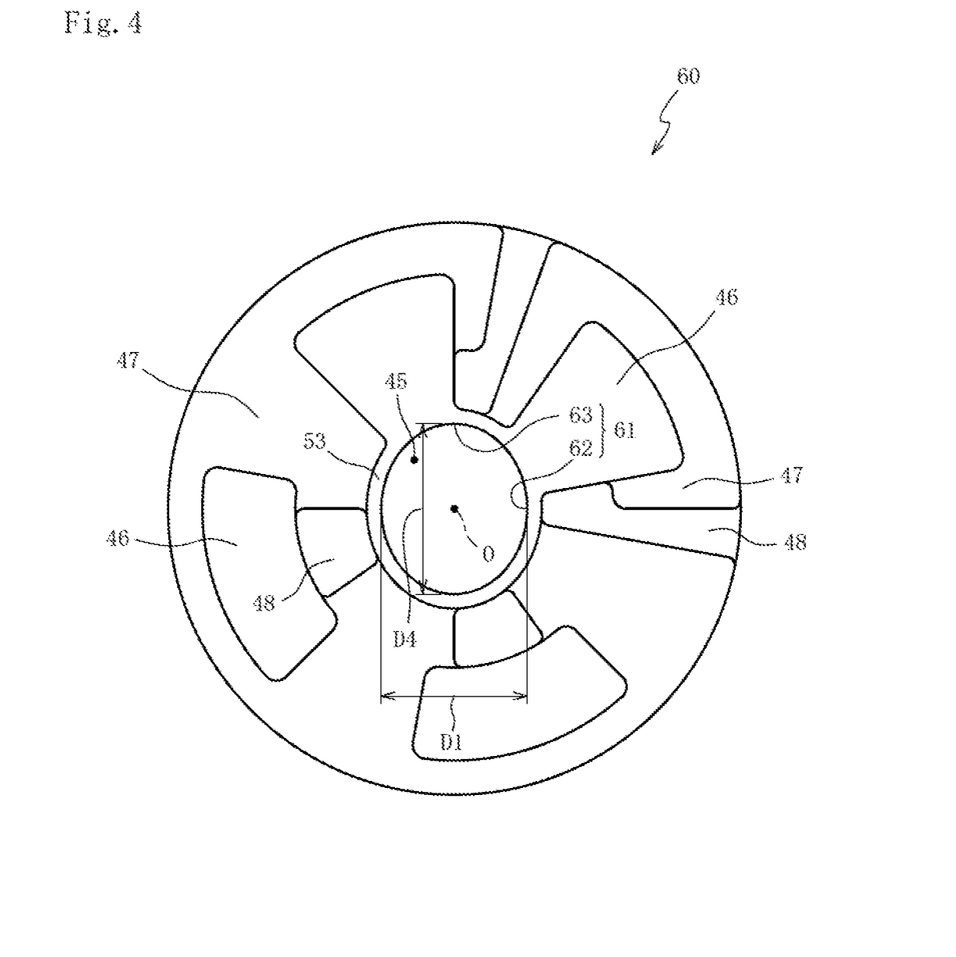
FIG. 4 is a plan view of a stopper of the vibration isolator according to a second embodiment.

The second embodiment will be described with reference to FIG. 4. In the first embodiment, the inner surface 49 of the hole 45 of the stopper 40 has a circular shape. On the other hand, in the second embodiment, a stopper 60 in which an inner surface 61 of the hole 45 is elliptical will be described. The same portions as those of the first embodiment will be denoted by the same reference numerals, and the description of such parts will be omitted. FIG. 4 is a plan view of the stopper 60 of the vibration isolator according to the second embodiment. The stopper 60 is arranged in place of the stopper 40 of the vibration isolator 10 in the first embodiment.

The stopper 60 is used with the shaft portion 13 inserted into the hole 45 penetrating the stopper 60. The inner surface 61 of the hole 45 is elliptical around the axis line O. The inner surface 61 includes: first portions 62 facing each other with a axis line O interposed therebetween; third portions 63 circumferentially connected to the first portions 62 and facing each other with a axis line O interposed therebetween; and a second portion (not illustrated) positioned between the first portion 62 and the second surface 44 (see FIG. 2). The span D4 (the length of the chord passing through the axis line O) of the third portion 63 is larger than the thickness (diameter) of the end portion 14 of the shaft portion 13. The span D1 (the length of the chord passing through axis line O) of the first portion 62 is smaller than the thickness (the diameter D3) of the end portion 14 of the shaft portion 13. Therefore, the stopper 60 can be less likely to detach from the shaft portion 13 due to friction between the shaft portion 13 and the first portion 62 in a state where the shaft portion 13 is inserted into the hole 45 of the stopper 40.

The third embodiment will be described with reference to FIG. 5. In the first embodiment, the height of the convex portion 53 of the stopper 40 is the same as the height of the first stopper surface 46. In contrast, in the third embodiment, a convex portion 73 of a stopper 70 is higher than the first stopper surface 46. The same portions as those of the first embodiment will be denoted by the same reference numerals, and the description of such parts will be omitted.

Figure 5:
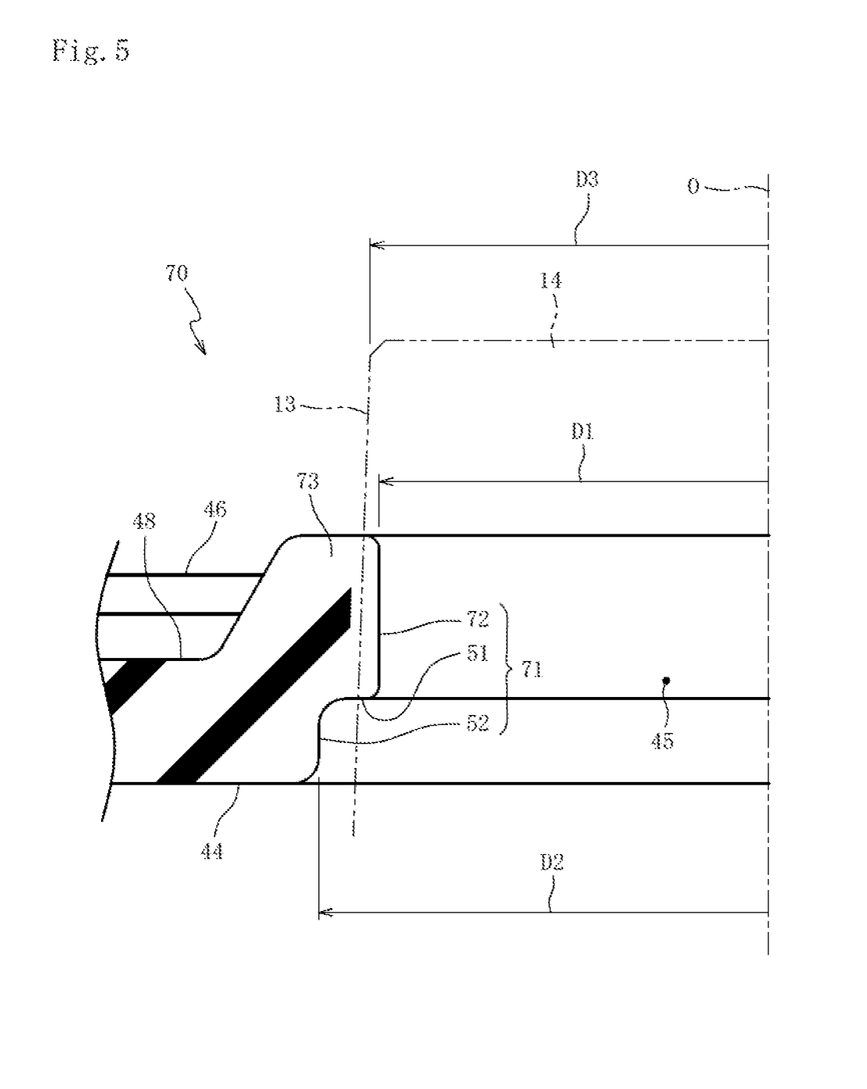
FIG. 5 is a cross-sectional view of a stopper of the vibration isolator according to a third embodiment.

FIG. 5 is a cross-sectional view of the stopper 70 according to the vibration isolator in the third embodiment. FIG. 5 omits the illustration of one side of the stopper 70 bounded by the axis line O (the same applies to FIGS. 6, 7 and 9). The stopper 70 is arranged in place of the stopper 40 of the vibration isolator 10 in the first embodiment.

The stopper 70 is used with the shaft portion 13 inserted into the hole 45 penetrating the stopper 70. When an inner surface 71 of the hole 45 is viewed from the first surface (see FIG. 2) in the direction of the axis line, the inner surface 71 is a circle centered on the axis line O. The inner surface 71 includes a first portion 72, the step 51, and the second portion 52 having a larger span D1 than the thickness (the diameter D3) of the end portion 14 of the shaft portion 13. The convex portion 73 having the first portion 72 formed inside is raised from the third stopper surface 48. The height of the convex portion 73 is higher than that of the first stopper surface 46. Since the convex portion 73 is arranged inside the displacement-regulating portion 23 (see FIG. 1), the convex portion 73 does not affect the load deflection curves of the stopper 70.

Figure 6:
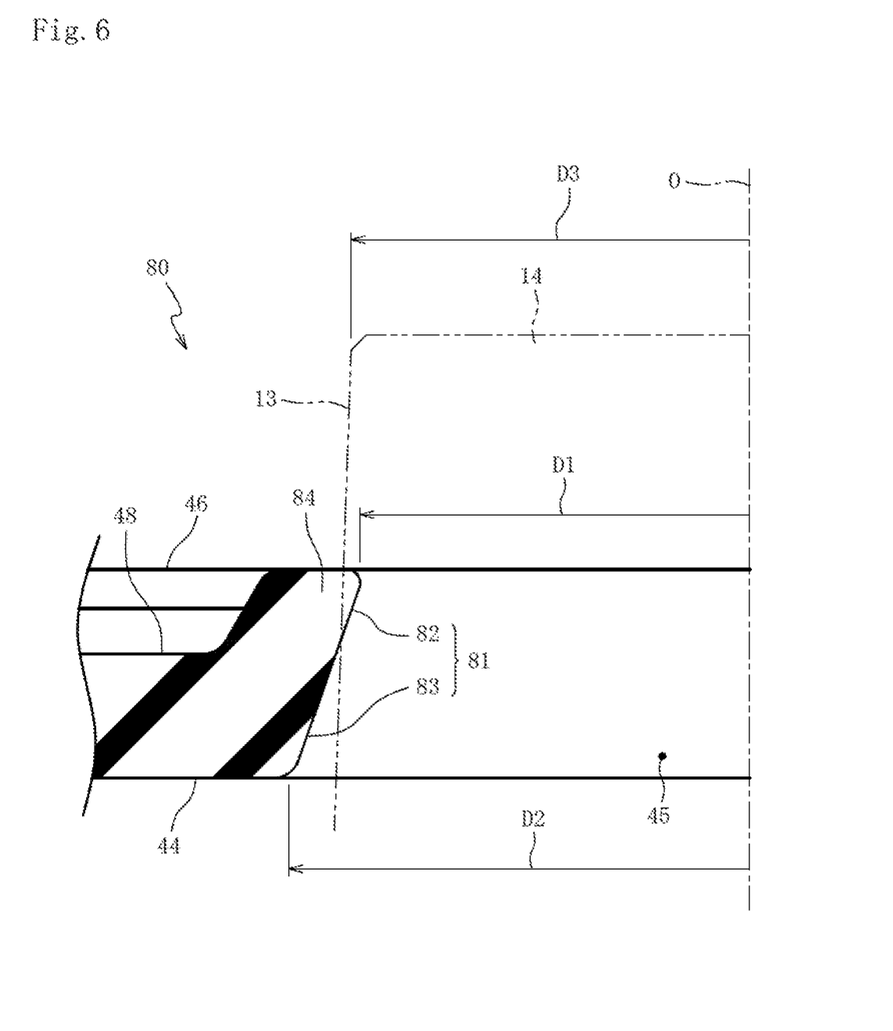
FIG. 6 is a cross-sectional view of a stopper of the vibration isolator according to a fourth embodiment.

The fourth embodiment will be described with reference to FIG. 6. In the first and the third embodiments, the step 51 is formed between the first portions 50, 72 and second the portion 52. On the other hand, in the fourth embodiment, a first portion 82 and the second portion 83 are smoothly connected to each other. The same portions as those of the first embodiment will be denoted by the same reference numerals, and the following description will be omitted. FIG. 6 is a cross-sectional view of a stopper 80 of the vibration isolator according to the fourth embodiment. The stopper 80 is arranged in place of the stopper 40 of the vibration isolator 10 in the first embodiment.

The stopper 80 is used with the shaft portion 13 inserted into the hole 45 penetrating the stopper 80. When an inner surface 81 of the hole 45 is viewed from the first surface 43 (see FIG. 2) in the direction of the axis line, the inner surface 81 is a circle centered on the axis line O. In the inner surface 81, the first portion 82 and a second portion 83 are smoothly connected. The first portion 82 and the second portion 83 are formed conically. A convex portion 84 having the first portion 82 formed inside is raised from the third stopper surface 48.

The first portion 82 is a portion in which the span D1 is smaller than the thickness (the diameter D3) of the end portion 14 of the shaft portion 13. The second portion 83 is a portion in which the span D2 is larger than the span Dl. The span D2 of the second portion 83 is larger than the thickness D3 of the end portion 14 of the shaft portion 13, and the second portion 83 is spaced from the shaft portion 13 in a state where the shaft portion 13 is inserted into the hole 45. Prior to the shaft portion 13 is inserted into the hole 45, the span of the inner surface 81 increases from the first portion 82 to the second portion 83. Therefore, the shaft portion 13 can be easily inserted into the hole 45 of the stopper 80.

Figure 7:
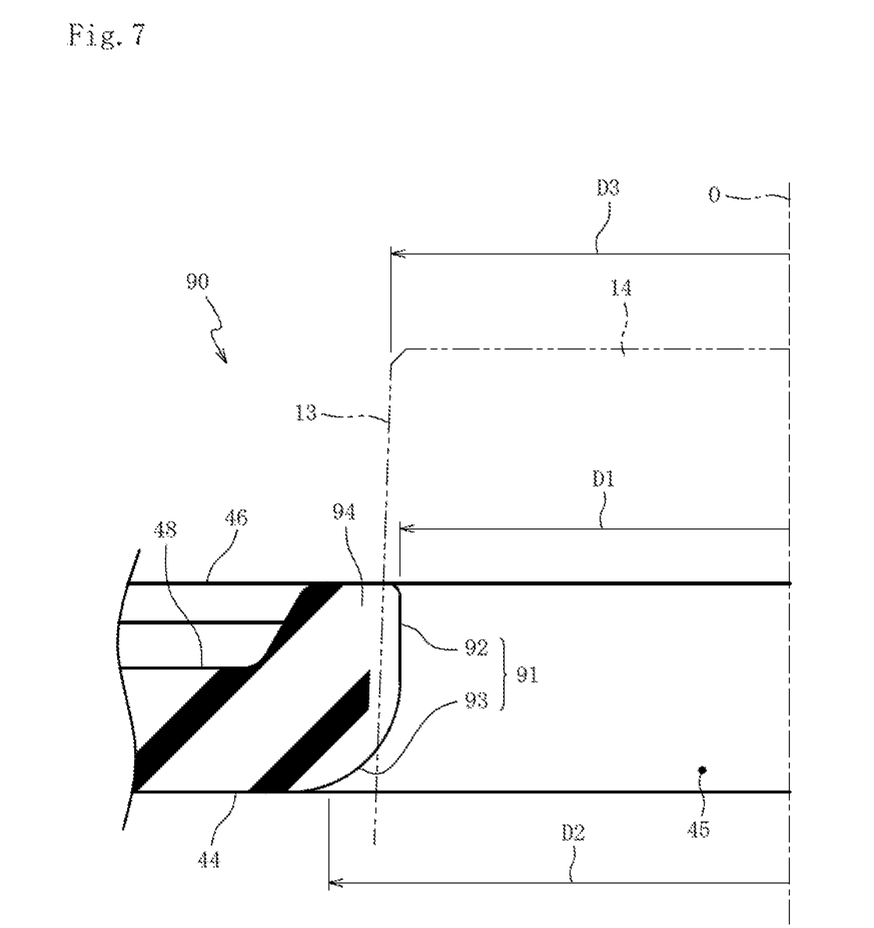
FIG. 7 is a cross-sectional view of a stopper of the vibration isolator according to a fifth embodiment.

The fifth embodiment will be described with reference to FIG. 7. In the fourth embodiment, the first portion 82 and the second portion 83, which are smoothly connected to each other, are formed in a conical shape. On the other hand, in the fifth embodiment, a first portion 92 formed in a cylindrical shape and a second portion 93 formed in a conical shape are smoothly connected to each other. The same portions as those of the first embodiment will be denoted by the same reference numerals, and the following description will be omitted. FIG. 7 is a cross-sectional view of the stopper 90 of the vibration isolator in the fifth embodiment. The stopper 90 is arranged in place of the stopper 40 of the vibration isolator 10 in the first embodiment.

The stopper 90 is used with the shaft portion 13 inserted into the hole 45 penetrating the stopper 90. When an inner surface 91 of the hole 45 is viewed from the direction of the axis line, the inner surface 91 is a circle centered on the axis line O. In the inner surface 91, the first portion 92 and the second portion 93 are smoothly connected. The first portion 92 is a cylindrical surface, and the second portion 93 is a conical surface that gradually increases in span toward the second surface 44. In the present embodiment, the second portion 93 is rounded so as to be convex radially inward. A convex portion 94 having the first portion 92 formed inside is raised from the third stopper surface 48.

The span D1 of the first portion 92 is smaller than the thickness (the diameter D3) of the end portion 14 of the shaft portion 13. The span D2 of the second portion 93 is greater than the thickness D3 of the end portion 14 of the shaft portion 13. In a state where the shaft portion 13 is inserted into the hole 45, the second portion 93 is spaced from the shaft portion 13. Prior to insertion of the shaft portion 13 into the hole 45, the span of the second portion increases as it approaches the second surface 44. Therefore, the shaft portion 13 can be easily inserted into the hole 45 of the stopper 90.

Figure 8:
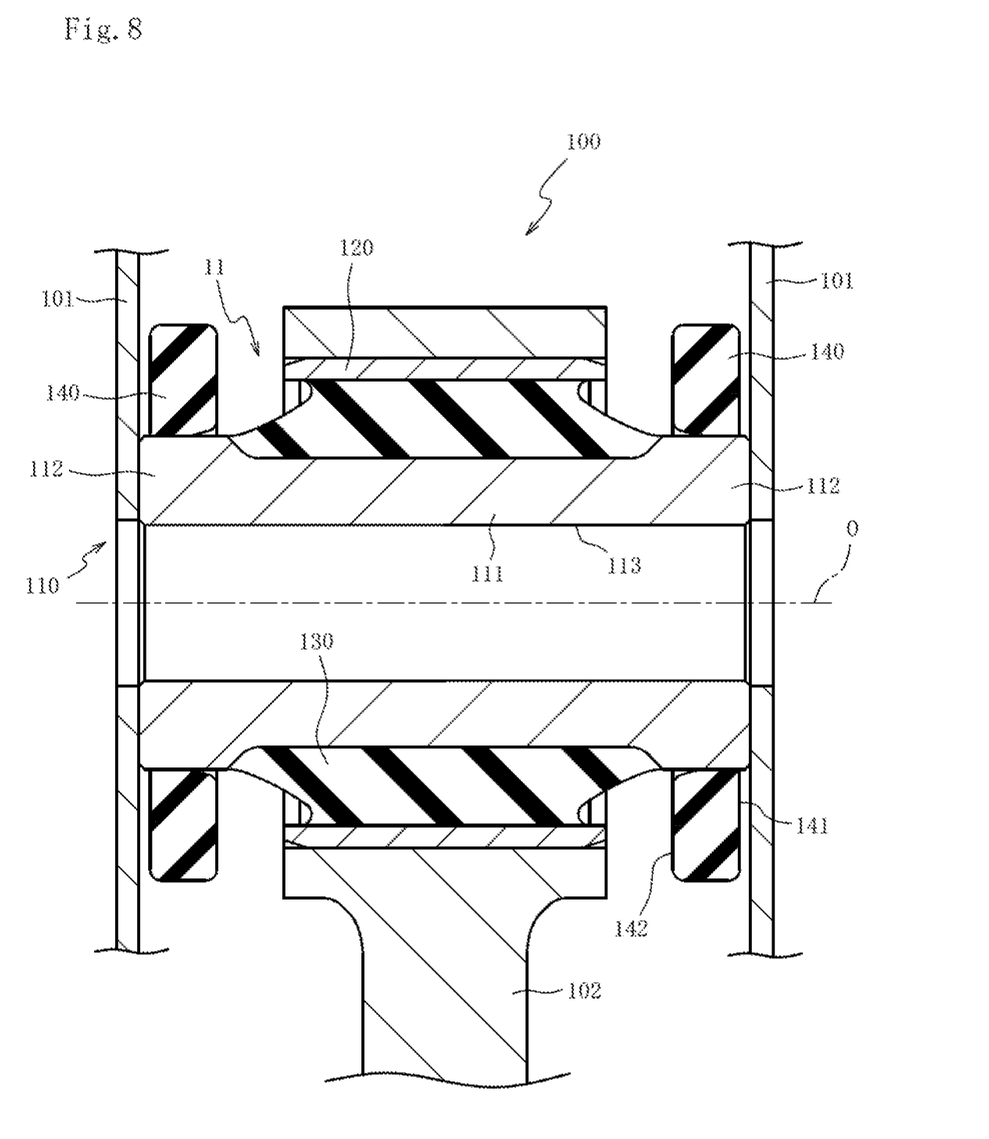
FIG. 8 is a cross-sectional view of the vibration isolator according to a sixth embodiment.

The sixth embodiment will be described with reference to FIGS. 8 and 9. In the first to fifth embodiments, the liquid-sealed vibration isolator 10 using the resonant phenomena of the liquid has been described. On the other hand, in the sixth embodiment, a vibration isolator 100 using no fluid will be described. FIG. 8 is a cross-sectional view including the axis line O of the vibration isolator 100 according to the sixth embodiment.

As illustrated in FIG. 8, the vibration isolator 100 elastically couples a mating member 101 such as brackets attached to, for example, a vehicle body and an arm 102 used for, for example, suspensions. The vibration isolator 100 comprises: a first member 110; a second member 120 spaced from the first member 110 and surrounding the first member 110; a substantially cylindrical vibration-isolation base 130 coupling the first member 110 and the second member 120; and a stopper 140 attached to the first member 110. The second member 120 is arranged radially outward of the first member 110. A vibration-isolation base 130 is made of an elastic body such as rubber or thermoplastic elastomer.

The first member 110 comprises a cylindrical shaft portion 111. A shaft portion 111 is formed with a hole 113 penetrating the center of the shaft portion 111 along the axis line O of the shaft portion 111. Bolts (not illustrated) for fixing the shaft portion 111 to the mating member 101 are inserted through the hole 113. By fastening the bolts, the shaft portion 111 is fixed to the mating member 101 with both end portions 112 of the shaft portion 111 in close contact with the mating member 101.

The second member 120 is a cylindrical metallic member having an inner diameter larger than the outer diameter of the shaft portion 111. The second member 120 is press fit into the arm 102. The length of the second member 120 in the direction of the axis line is shorter than the length of shaft portion 111 in the direction of the axis line. The second member 120 is arranged at the axis line center of the shaft portion 111, and the vibration-isolation base 30 is bonded to the outer peripheral surface of the shaft portion 111 and the inner peripheral surface of the second member 120.

The stopper 140 is a plate-like member. The stopper 140 is made of an elastic body such as rubber or thermoplastic elastomer. The shaft portion 111 penetrates the center of the stopper 140. The stopper 140 is arranged between the second member 120 and the mating member 101 with a first surface 141 of the stopper 140 facing the mating member 101 and the second surface 142 of the stopper 140, the opposite side of the first surface 141, facing the second member 120. The stopper 140 regulates the relative displacement of the second member 120 in the direction of the axis line relative to the first member 110, and mitigates the collision between the arm 102 or the second member 120 and the mating member 101.

Figure 9:
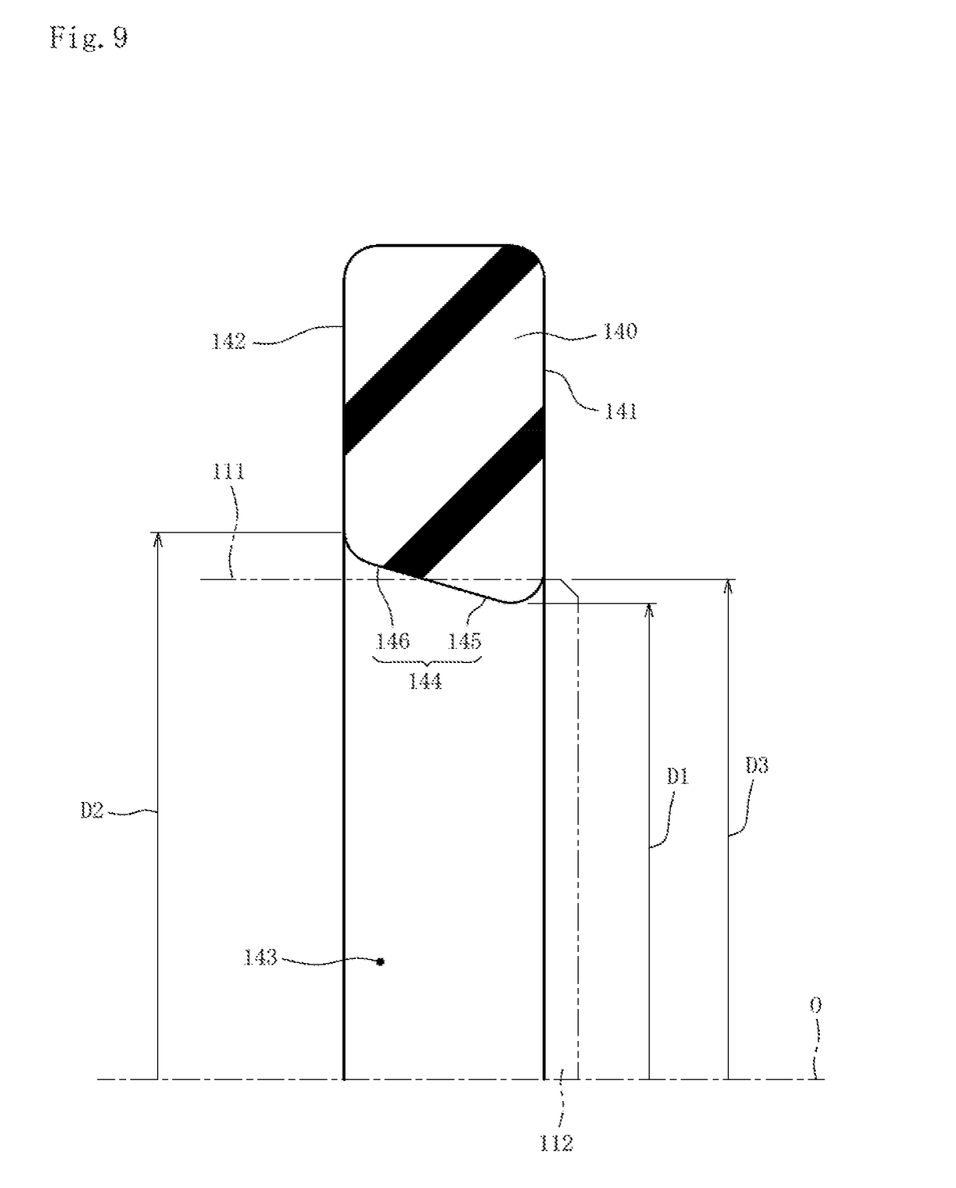
FIG. 9 is a cross-sectional view including the axis line of a stopper.

FIG. 9 is a cross-sectional view of the stopper 140 including the axis line O. In the center of the stopper 140, a hole 143 is formed to connect from the first surface 141 to the second surface 142. The hole 143 penetrates the stopper 140. An inner surface 144 of the hole 143 is circular about the axis line O when viewed from the axis line.

The inner surface 144 of the hole 143 includes a first portion 145 connected to the first surface 141, and a second portion 146 positioned between the first portion 145 and the second surface 142. The second portion 146 is smoothly connected to the first portion 145. The first portion 145 and the second portion 146 are conical surfaces that gradually increase in span toward the second surface 142. The span D1 of the first portion 145 is smaller than the thickness (the diameter D3) of the end portion 112 of the shaft portion 111. As a result, the stopper 140 is fixed to the shaft portion 111 due to friction between the first portion 145 and the shaft portion 111.

The span D2 of the second portion 146 is larger than the thickness D3 of the end portion 112 of the shaft portion 111. In a state where the shaft portion 111 is inserted into the hole 143, the second portion 146 is spaced from the shaft portion 111. Prior to the shaft portion 111 is inserted into the hole 143, the span of the second portion 146 increases as it approached the second surface 142. Therefore, the shaft portion 111 can be easily inserted into the hole 143 of the stopper 140.

Although the present invention has been described based on embodiments, the present invention is not limited to the above-described embodiments in any way, and it can be easily understood that various improvements and modifications are possible within the spirit of the present invention.

Although, the shaft portion 13 is formed in a tapered shape and the diameter of the outer peripheral surface gradually decreases toward the end portion 14 in the embodiment, the shaft portions are not necessarily limited to this. For example, the dimensions of a shaft portion 13 may, of course, be set such that the diameters of the outer peripheral surfaces of the shaft portion 13 are the same over the entire axis line length. The shaft portion 13 may be rod-shaped, and the cross-sectional shape of the shaft portion 13 may be set as appropriate.

Although, the first stopper surface 46, the second stopper surface 47, and the third stopper surface 48 having different heights are formed on the first surface 43 of the stoppers 40, 60, 70, 80, or 90 in the embodiment, the first surfaces are not necessarily limited to this. Of course, the first stopper surface 46, the second stopper surface 47, and the third stopper surface 48 may be omitted and the first surface 43 may be flattened.

Although, in the embodiment, the shapes of inner surfaces 49, 61, 71, 81, 91, and 144 of stoppers 40, 60, 70, 80, 90, and 140 are circular or elliptical when viewed from the axis line (in the plan view), the shapes of inner surfaces are not necessarily limited to this. For example, polygons, such as a rectangle and a star polygon, can be adopted as a hole shape of a stopper in the plan view. The spans of the first portion and the second portion in the stopper at this time are the length of the shortest line segment of the line segment obtained by cutting a straight line passing through the center of hole (the axis line O) by the inner surface of the hole in the plan view of the stopper.

Although, in the embodiment, the stoppers 40, 60, 70, 80, 90, 140 is made of an elastic body such as rubber or thermoplastic elastomer, the stoppers are not necessarily limited to this. The stopper may, of course, be formed by embedding a reinforcing member made of material, such as metals or synthetic resins, in an elastic body. The sizes and shapes of the reinforcing members may be set as appropriate according to the size and shape of a stopper.

Each of the embodiments may be modified by, for example, adding a part or a plurality of parts of the configuration of another embodiment to the embodiment, replacing the part or a plurality of parts of the configuration of the embodiment.

For example, the stopper of the vibration isolator in the first to the fifth embodiments can, of course, be adopted for the stopper of the vibration isolator in the sixth embodiment. Similarly, the stopper of the vibration isolator in the sixth embodiment can, of course, be adopted for the stopper of the vibration isolator in the first to fifth embodiments. In addition, the step 51 can be provided between the first portions 82, 145 and the second portions 83, 146 in the inner surface 81 of the hole 45 of the stopper 80 in the fourth embodiment or the inner surface 144 of the hole 143 of the stopper 140 in the sixth embodiment, or the shape of the second portion 93 of the stopper 90 in the fifth embodiment can be changed to the shape of the second portion 83 of the stopper 80 in the fourth embodiment.

Although, a vibration isolator for a motor vehicle has been described in the embodiment, the present invention is not necessarily limited to this. The present invention can also be applied to a vibration isolator used for, such as motorcycles, railway vehicles, and industrial vehicles. The vibration isolator 10 is not limited to an engine mount for elastically supporting a power unit such as an engine, and can be applied to various types of vibration isolator such as a body mount, a sub-frame mount, and a differential mount.

What is claimed is:

1. A vibration isolator comprising:
    a first member including a shaft portion extending along an axis line, an end portion of the shaft portion being fixed to a mating member;
    a second member spaced from the first member and at least a portion of the second member spaced from the shaft portion in the direction perpendicular to the axis line;
    a vibration-isolation base made of an elastic body connecting the second member and the first member; and
    a stopper made of an elastic body having a first surface, a second surface and a hole connecting the first surface and the second surface;
    the stopper arranged in a state where the shaft portion of the first member is arranged in the hole with the end portion facing the mating member, and arranged between the second member and the mating member with the first surface facing the mating member and the second surface facing the second member, and
    an inner surface of the hole of the stopper, prior to the shaft portion is arranged in the hole, including:
        a first portion having a span smaller than the thickness of the end portion of the shaft portion; and
        a second portion arranged between the first portion and the second surface,
    wherein a span of the second portion is greater than the span of the first portion.

2. The vibration isolator according to claim 1, wherein the first portion is in contact with the shaft portion when the shaft portion is arranged in the hole.

3. The vibration isolator according to claim 2, wherein the first portion includes the entire periphery of the inner surface.

4. The vibration isolator according to claim 1, wherein the stopper has a convex portion raised in the axial direction from at least a portion of the first surface around the hole, and the first portion includes inside the convex portion.

5. The vibration isolator according to claim 4, wherein the stopper includes a step between the first portion and the second surface,
    the second portion is disposed between the step and the second surface and spaced from the shaft portion when the shaft portion is arranged in the hole.

6. The vibration isolator according to claim 1, wherein, prior to the shaft portion is arranged in the hole, the span of the second portion is greater than thickness of the end portion of the shaft portion.

7. The vibration isolator according to claim 1, wherein, prior to the shaft portion is arranged in the hole, the span of the inner surface is increased from the first portion to the second portion.

* * * * *